United States Patent
Hiyoshi et al.

(10) Patent No.: US 6,622,670 B2
(45) Date of Patent: Sep. 23, 2003

(54) PISTON CRANK MECHANISM OF RECIPROCATING INTERNAL COMBUSTION ENGINE

(75) Inventors: Ryosuke Hiyoshi, Kanagawa (JP); Shunichi Aoyama, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/927,330

(22) Filed: Aug. 13, 2001

(65) Prior Publication Data

US 2002/0026910 A1 Mar. 7, 2002

(30) Foreign Application Priority Data

Oct. 17, 2000 (JP) .......................... 2000-316020
Aug. 14, 2000 (JP) .......................... 2000-245448

(51) Int. Cl.[7] .............................................. F02B 75/04
(52) U.S. Cl. ................................................. 123/48 B
(58) Field of Search ...................... 123/78 R, 48 B, 123/78 F, 197.3, 78 E

(56) References Cited

U.S. PATENT DOCUMENTS

| | | | |
|---|---|---|---|
| 3,633,429 A | | 1/1972 | Olson |
| 4,517,931 A | * | 5/1985 | Nelson ................ 123/197.4 |
| 6,125,802 A | * | 10/2000 | Pen ..................... 123/197.4 |
| 6,390,035 B2 | * | 5/2002 | Moteki et al. .......... 123/78 BA |

FOREIGN PATENT DOCUMENTS

| | | |
|---|---|---|
| DE | 612 405 | 4/1935 |
| DE | 299 13 107 U1 | 11/1999 |
| JP | 9-228858 | 9/1997 |

OTHER PUBLICATIONS

"Design Engineering News." Product Engineering (Dec. 1976): pp. 18–19.
Patent Abstracts of Japan, vol. 2000, No. 06, Sep. 22, 2000, Masahiko, "Internal Combustion Engine and Control Device Therefor", publication No. 2000 073804 A, Mar. 7, 2000,.

* cited by examiner

Primary Examiner—Henry C. Yuen
Assistant Examiner—Hyder Ali
(74) Attorney, Agent, or Firm—Foley & Lardner

(57) ABSTRACT

A piston crank mechanism of an internal combustion engine includes an upper link connected to a piston, a lower link connected to both the upper link and a crankpin, and a control link through which the lower link is linked to an eccentric cam of a control shaft to restrict the degree of freedom of the lower link. By varying the angular position of the eccentric cam with respect to the control-shaft axis, the center of oscillating motion of the control link varies, thus varying a compression ratio. The center of gravity of the lower link, determined by an equivalent inertia weight obtained by adding weights of connecting pins and weights of the upper-link boss-shaped end and the control-link boss-shaped end connected to the lower link via the respective connecting pins to the lower-link self-weight, is situated closer to the center of the crankpin.

22 Claims, 11 Drawing Sheets

PISTON CRANK MECHANISM OF RECIPROCATING INTERNAL COMBUSTION ENGINE

TECHNICAL FIELD

The present invention relates to a piston crank mechanism of a reciprocating internal combustion engine, and particularly to a variable compression ratio mechanism of a reciprocating piston engine capable of varying the top dead center (TDC) position of a piston by means of a multiple-link type piston crank mechanism.

BACKGROUND ART

In order to vary a compression ratio between the volume in the engine cylinder with the piston at bottom dead center (BDC) and the volume with the piston at top dead center (TDC) depending upon engine operating conditions such as engine speed and load, in recent years, there have been proposed and developed multiple-link type reciprocating piston engines. In multiple-link type piston crank mechanisms (multiple-link type variable compression ratio mechanisms), a linkage is generally composed of three links, namely an upper link, a lower link, and a control link. One end of the upper link is connected via a piston pin to a reciprocating piston. The lower link is connected to the other end of the upper link. The lower link is also linked to a crankpin of an engine crankshaft. The control link mechanically links the lower link to a body (e.g., a cylinder block) of the engine, so as to restrict the degree of freedom of the lower link. The center of oscillating motion of control link 7 is designed to be controlled depending upon engine operating conditions. By changing or shifting the center of oscillating motion of the control link, the attitude of the lower link changes, thus varying the TDC position of the piston and consequently varying the compression ratio of the engine. Such multiple-link type variable compression ratio mechanisms have been disclosed in Japanese Patent Provisional Publication No. 9-228858 (hereinafter is referred to as "JP9-228858") and in page 19 of the December issue for 1976 of the design engineering news "Product Engineering". In the multiple-link type variable compression ratio mechanism, the lower link oscillates around the connecting point (serving as a fulcrum point or a pivot point) between the lower link and the control link, as the crankpin swings or rotates in a circle during rotation of the crankshaft. Thus, the lower link (intermediate link) functions to transmit the motion of the crankpin to the piston, while multiplying the displacement of the crankpin. The piston stroke is 2 times or more the radius of a crank, on the principle of lever-and-fulcrum or leverage. In other words, the ratio of piston stroke to the diameter of revolution of the crankpin (or the ratio of piston stroke to crank radius) can be multiplied via the lower link. Therefore, a great combustion load (combustion pressure) or inertial force acts upon the lower link in its bending direction through the piston pin and the upper link.

SUMMARY OF THE INVENTION

In a variable displacement engine disclosed in JP9-228858, an oscillating or rockable lever (called a bridge and corresponding to a lower link) is provided between a control arm (called a rocking arm and corresponding to a control link) and a connecting rod (corresponding to an upper link), for the purpose of varying the TDC position of a piston by an oscillating motion of the so-called bridge, thereby varying the compression ratio. However, in the variable displacement engine disclosed in JP9-228858, the connecting point between the upper and lower links, the connecting point between the control link and the lower link, and the crankpin axis are substantially aligned with each other. This lower link is formed as an elongated intermediate link. The structural design of the lower link (bridge) is insufficient from the viewpoint of a flexural rigidity. To enhance the flexural rigidity of the lower link, as disclosed in page 19 of the December issue for 1976 of the design engineering news "Product Engineering", it is desirable to design the shape and dimensions of the lower link such that the connecting point between the upper and lower links, the connecting point between the control link and the lower link, and the crankpin axis are laid out at the respective vertexes of a triangle. However, in the multiple-link type variable compression ratio mechanism (multiple-link type piston crank mechanism) using the lower link having such a triangular layout of the three connecting portions, there is an increased tendency for second-order frequency components of the lower link to be created undesirably. Assuming that the multiple-link type piston crank mechanism with the lower link having the previously-noted triangular layout is mounted on an automotive vehicle, undesirable noise (containing booming noise) and vibration may be perceived audibly in the vehicle compartment. This deteriorates noise/vibration attenuation characteristics during operation of the engine. The inventors of the present invention discover that it is possible to effectively attenuate second-order vibration frequency components created owing to the lower link having the triangular layout by properly setting a position of the center of gravity of the lower link.

It is, therefore in view of the above-mentioned disadvantages, an object of the present invention to provide a multiple-link type piston crank mechanism of a reciprocating internal combustion engine in which second-order vibration frequency components created due to a lower link constructing part of the multiple-link type piston crank mechanism and having a triangular layout of three connecting portions can be effectively attenuated by way of proper setting of a position of the center of gravity of the lower link.

In order to accomplish the aforementioned and other objects of the present invention, a piston crank mechanism of a reciprocating internal combustion engine including a piston moveable through a stroke in the engine and having a piston pin and a crankshaft changing reciprocating motion of the piston into rotating motion and having a crankpin, the piston crank mechanism comprises an upper link connected at one end to the piston via the piston pin, a lower link connected to the other end of the upper link via a first connecting pin and connected to the crankpin, a control link connected at one end to the lower link via a second connecting pin and pivoted at its other end to a body of the engine to permit oscillating motion of the control link on the body of the engine, a center-of-gravity of the lower link lying inside of a triangle defined by three vertexes corresponding to a center of the first connecting pin, a center of the second connecting pin, and a center of the crankpin, and a distance from the center-of-gravity to the center of the crankpin is less than at least one of a distance from the center-of-gravity to the center of the first connecting pin and a distance from the center-of-gravity to the center of the second connecting pin.

According to another aspect of the invention, a piston crank mechanism of a reciprocating internal combustion engine including a piston moveable through a stroke in the engine and having a piston pin and a crankshaft changing reciprocating motion of the piston into rotating motion and having a crankpin, the piston crank mechanism comprises an upper link connected at one end to the piston via the piston pin, a lower link connected to the other end of the upper link via a first connecting pin and connected to the crankpin, a control link connected at one end to the lower link via a second connecting pin and pivoted at its other end to a body of the engine to permit oscillating motion of the control link on the body of the engine, a triangle being defined by three line segments, namely a first line segment between and including a center of the crankpin and a center of the first connecting pin, a second line segment between and including the center of the crankpin and a center of the second connecting pin, and a third line segment between and including the center of the first connecting pin and the center of the second connecting pin, a first center-of-gravity of the lower link, which is determined by a self-weight of the lower link itself except at least a weight of the first connecting pin and a weight of the second connecting pin, is laid out to be opposite to each of the first and second connecting pins with respect to the center of the crankpin, and a second center-of-gravity of the lower link, which is determined by an equivalent inertia weight obtained by adding the weight of the first connecting pin, the weight of the second connecting pin, a weight of a boss-shaped end of the upper link connected to the first connecting pin, and a weight of a boss-shaped end of the control link connected to the second connecting pin to the self-weight of the lower link, is laid out closer to the center of the crankpin than the first center-of-gravity.

The other objects and features of this invention will become understood from the following description with reference to the accompanying drawings.

DESCRIPTION OF THE PREFERRED EMBODIMENTS

Figure 1:
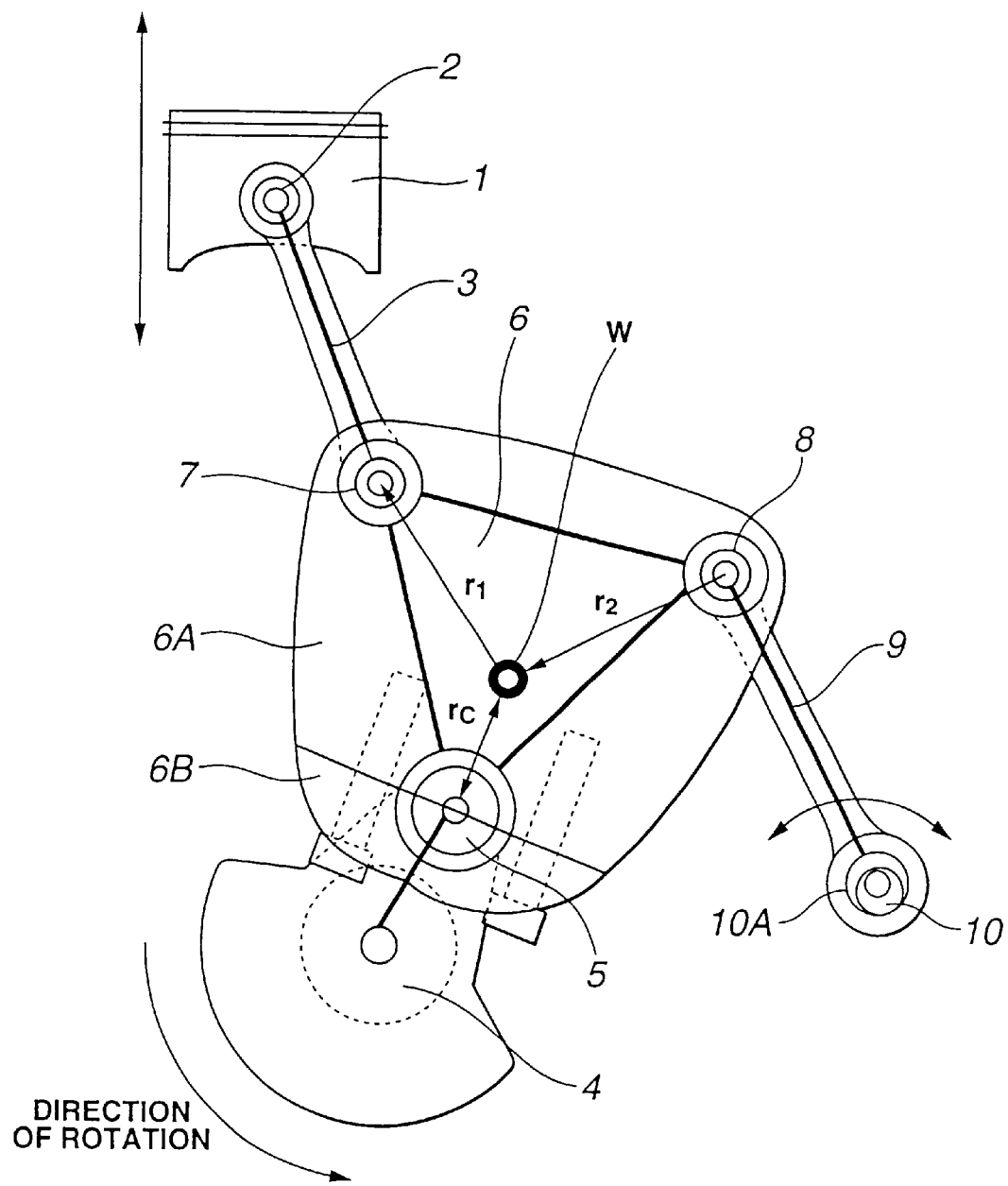
FIG. 1 is an assembled view showing one embodiment of a multiple-link type piston crank mechanism (a variable compression ratio mechanism) for a reciprocating engine.

Referring now to the drawings, particularly to FIG. 1, the multiple-link type piston crank mechanism of the invention is constructed to function as a variable compression ratio mechanism. The linkage of the multiple-link type piston crank mechanism is comprised of three links, namely an upper link 3, a lower link 6, and a control link 9. Upper link 3 is connected at one end via a piston pin 2 to a reciprocating piston 1. Lower link 6 is oscillatingly connected to the other end of upper link 3 by means of a first connecting pin 7. Lower link 6 is also mechanically linked to a crankpin 5 of a crankshaft 4. Control link 9 is oscillatingly connected at one end to lower link 6 by means of a second connecting pin 8. The other end of control link 9 is linked to a body (e.g., a cylinder block) of the engine, so as to restrict the degree of freedom of lower link 6. Piston 1 is slidable through a stroke in a cylinder (not shown) defined in a cylinder block (not shown). The piston crown of piston 1 defines a combustion chamber in conjunction with an inner wall surface of a cylinder head (not shown). In more detail, the other end of control link 9 is oscillatingly or rockably supported by means of an eccentric cam portion 10A of a control shaft 10. Control shaft 10 is located at the lower part of the cylinder block. By varying the angular position of eccentric cam portion 10A with respect to the axis of control shaft 10, the center of oscillating motion of the lower end (viewing FIG. 1) of control link 9 varies. With the displacement of the center of oscillating motion of the lower end of control link 9, the TDC position of piston 1 (that is, the compression ratio) is variable. In FIG. 1, crankshaft 4 rotates counterclockwise.

Figure 5:
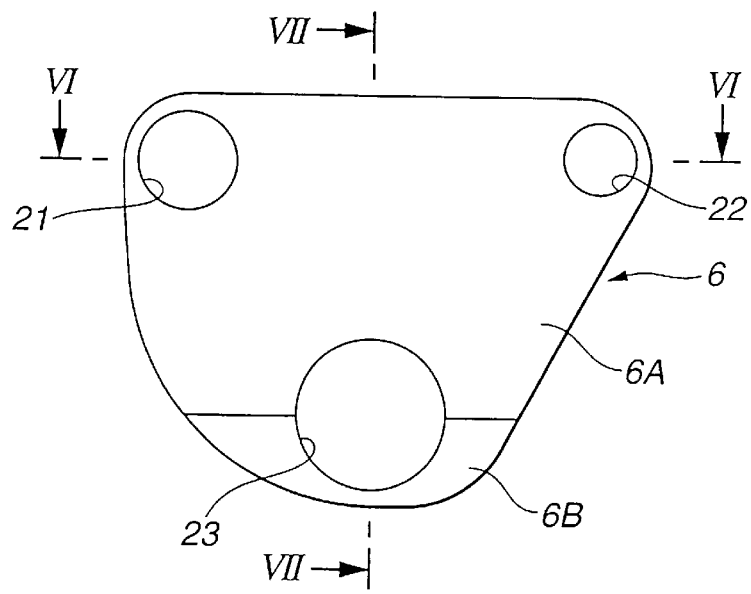
FIG. 5 is an elevation view illustrating one structural shape of the lower link.

As will be fully described later, lower link 6 has a two-split structure. As shown in FIGS. 1 and 5, lower link 6 is divided into two parts, namely a main lower link portion 6A and a cap portion 6B, along a plane that passes through the center of crankpin 5, in other words, through the crankpin axis. When assembling, the main lower link portion and the cap portion are matched to each other by means of a fastening means, such as bolts and nuts. As clearly shown in FIG. 1, lower link 6 is designed and dimensioned such that the center of crankpin 5, the center of first connecting pin 7, and the center of second connecting pin 8 are laid out at the respective vertexes of a triangle. In other words, the triangle is defined by three line segments, namely a first line segment between and including the center of crankpin 5 and the center of first connecting pin 7, a second line segment between and including the center of crankpin 5 and the center of second connecting pin 8, and a third line segment between and including the center of first connecting pin 7 and the center of second connecting pin 8. A so-called skeleton diagram indicated by the thick solid line of FIG. 1 represents each of the upper and lower links, the crank, and the control link included in the multiple-link type piston crank mechanism. In FIG. 1, a point denoted by W corresponds to a center of gravity of lower link 6. In the multiple-link type piston crank mechanism (multiple-link type variable compression ratio mechanism) of the embodiment, the center-of-gravity W exists or lies inside of the previously-noted triangle defined by three vertexes or apexes, namely the center of crankpin 5, the center of first connecting pin 7, and the center of second connecting pin 8. Suppose that rc denotes the distance from the center-of-gravity W of lower link 6 to the center of crankpin 5, r1 denotes the distance from the center-of-gravity W to the center of first connecting pin 7, and r2 denotes the distance from the center-of-gravity W to the center of second connecting pin 8. Then, the position of center-of-gravity W is designed or determined to satisfy at least one of two conditions defined by a first inequality rc<r1 and a second inequality rc<r2. Actually, in the mechanism of the embodiment, the position of center-of-gravity W is determined to satisfy the two conditions defined by the first inequality rc<r1 and the second inequality rc<r2. It is more preferable that the distance rc is "0", in other words, the center-of-gravity W of lower link 6 is situated to be identical to the center of crankpin 5. In an assembled state of the multiple-link type piston crank mechanism of the embodiment, the center-of-gravity W of lower link 6 is determined by or derived from an equivalent inertia weight $(W_0+W_1+W_2+W_3+W_4)$ of lower link 6 containing a weight $W_1$ of first connecting pin 7, a weight $W_2$ of second connecting pin 8, a weight $W_3$ of the lower boss-shaped end of upper link 3, and a weight $W_4$ of the upper boss-shaped end of control link 9. On the other hand, a center of gravity, which is determined by or derived from only a self-weight $W_0$ of the lower link itself except the above-mentioned weights $W_1$, $W_2$, $W_3$ and $W_4$, is arranged or laid out to be opposite to each of first and second connecting pins 7 and 8 with respect to the center of crankpin 5, that is, with respect to the crankpin axis used as a reference. The structural shape and dimensions of lower link 6 are designed or determined, so that the center-of-gravity W is situated near the center of crankpin 5 or situated to be identical to the center of crankpin 5, by actually adding the weights $W_1$ and $W_2$ of first and second connecting pins 7 and 8, the weight $W_3$ of the lower boss-shaped end of upper link 3, and the weight $W_4$ of the upper boss-shaped end of control link 9 to the self-weight $W_0$ of the lower link itself. In other words, the center of gravity of only the lower link member of the weight $W_0$ is determined so that the position of the center of gravity derived from the previously-noted equivalent inertia weight $(W_0+W_1+W_2+W_3+W_4)$ is optimized or situated as close to the crankpin axis as possible in the actually assembled state. However, regardless of the center-of-gravity W derived from the equivalent inertia weight $(W_0+W_1+W_2+W_3+W_4)$ of lower link 6 or the center of gravity derived from only the self-weight $W_0$ of lower link 6, the fundamental shape, geometry and dimensions of lower link 6 of the embodiment are designed or determined to satisfy both the first inequality rc<r1 and the second inequality rc<r2. Additionally, the angular velocity of first connecting pin 7 is set to be higher than that of crankpin 5 at the midpoint of piston stroke at which the piston velocity reaches its peak. That is, lower link 6 serves as a swing lever that oscillates around second connecting pin 8. Actually, the second connecting pin serves as a fulcrum point of the lower link. The control link and the lower link are connected to each other via the second connecting pin to permit relative rotation. Thus, lower link 6 acts to transmit the motion of crankpin 5 to piston 1, while multiplying the displacement (motion) of crankpin 5. Therefore, in comparison with a radius of a crank of a typical reciprocating internal combustion engine with a piston crank mechanism and of the same engine's displacement, the crank radius of the reciprocating engine with the multiple-link type piston crank mechanism can be reduced or shortened.

Figure 2:
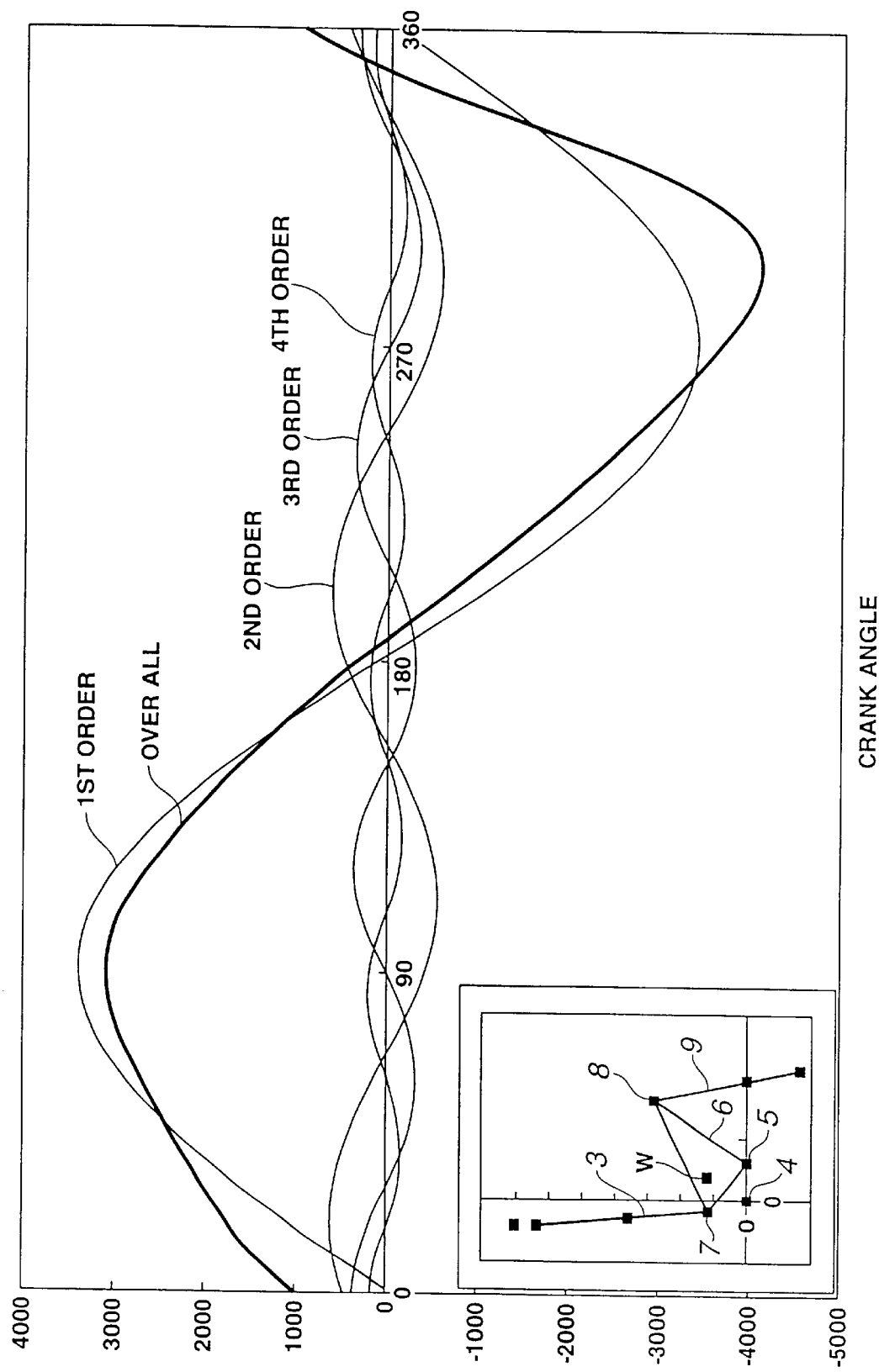
FIG. 2 is a chart illustrating characteristic curves of 1st-order, 2nd-order, 3rd-order, 4th-order, and over-all vibration frequency components in a state that the center-of-gravity W of the lower link is located away from the center of the crankpin.
Figure 3:
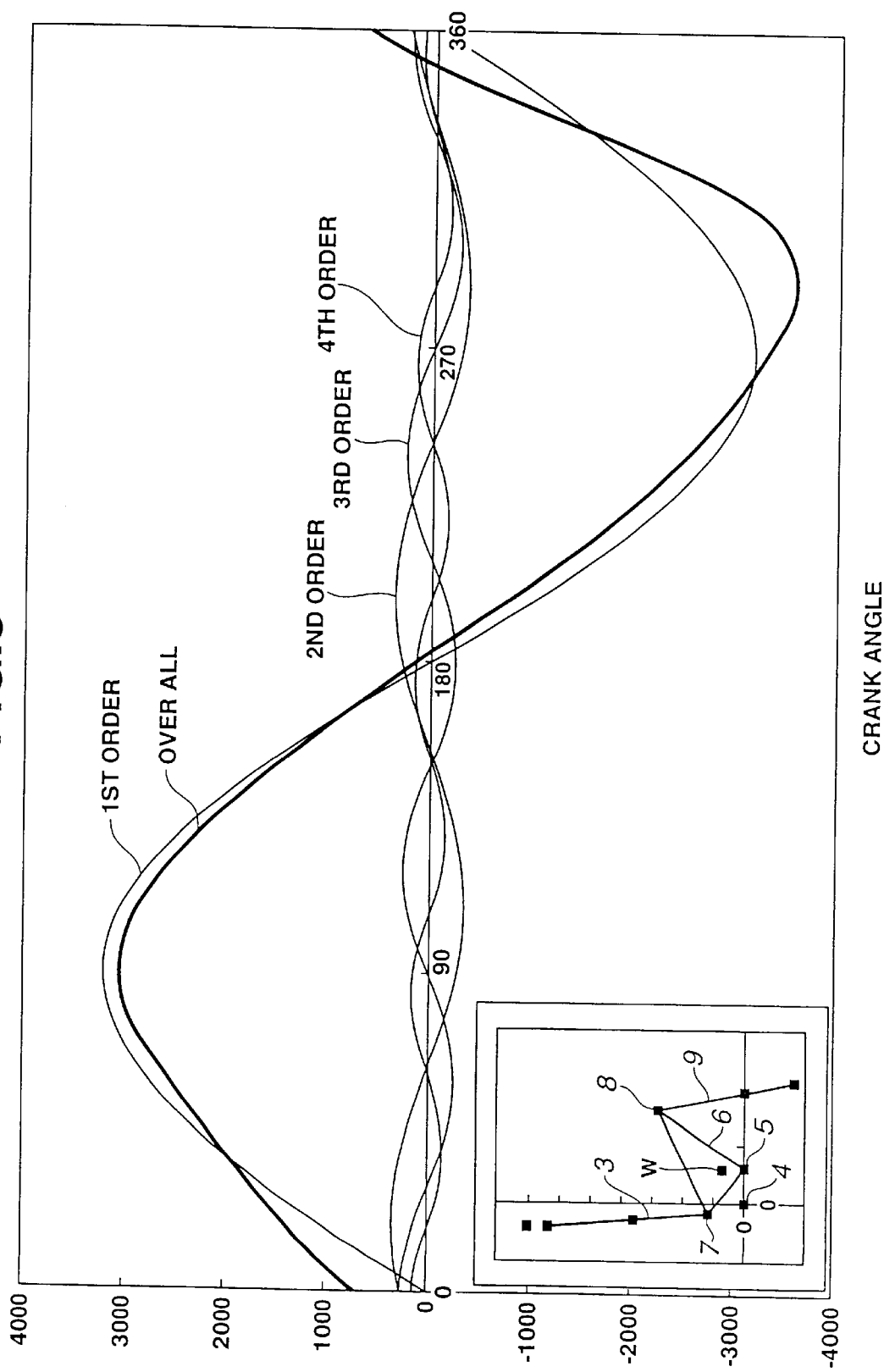
FIG. 3 is a chart illustrating characteristic curves of 1st-order, 2nd-order, 3rd-order, 4th-order, and over-all vibration frequency components in a state that the center-of-gravity W is located near the center of the crankpin.
Figure 4:
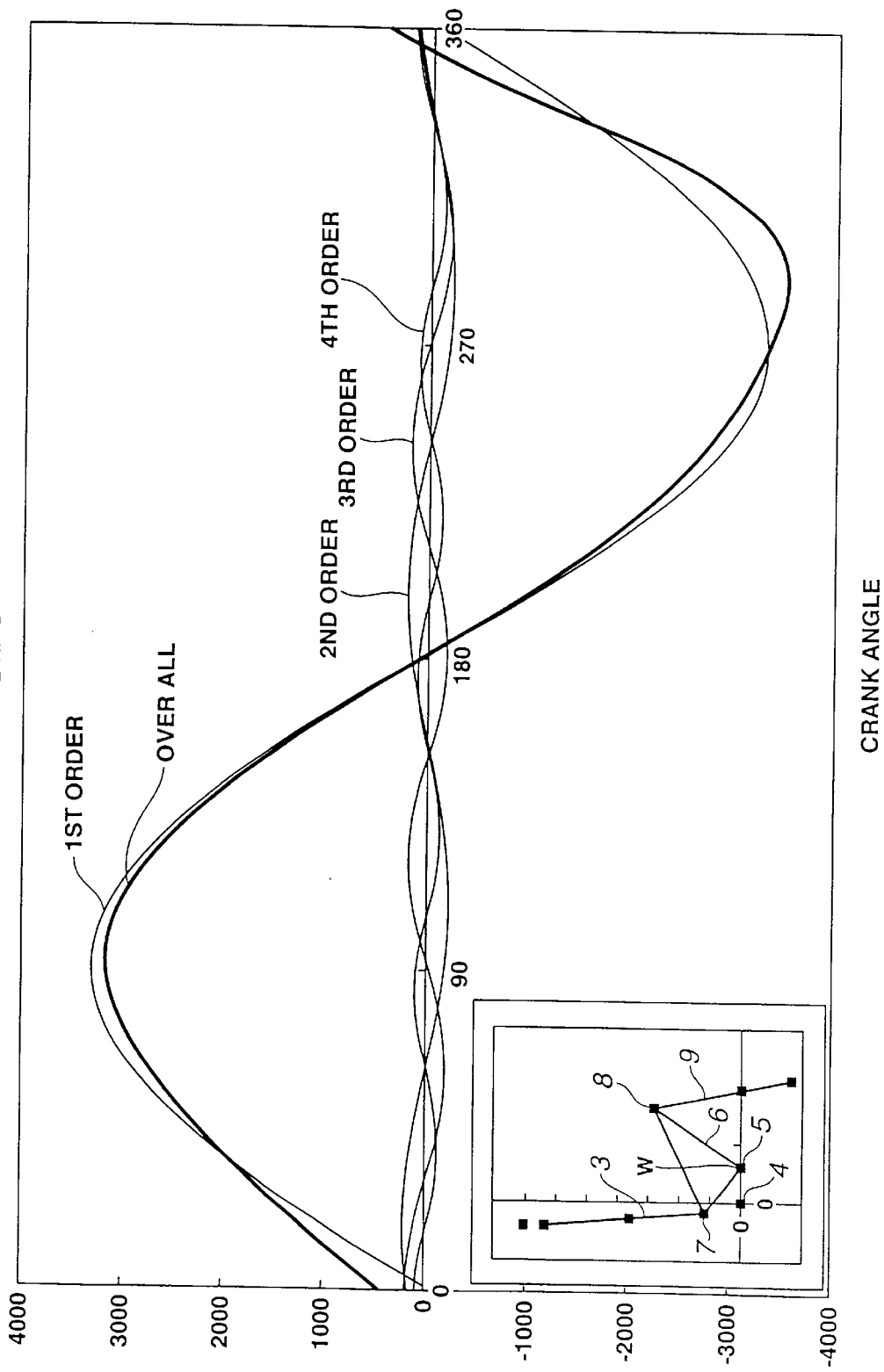
FIG. 4 is a chart illustrating characteristic curves of 1st-order, 2nd-order, 3rd-order, 4th-order, and over-all vibration frequency components in a state that the center-of-gravity W is located to be identical to the center of the crankpin.

Referring now to FIGS. 2 through 4, there are shown first-order, second-order, third-order, fourth-order and over-all frequency characteristics of vibration occurring at the multiple-link type piston crank mechanism respectively depending upon the position of center-of-gravity W of lower link 6 relative to the center of crankpin 5. As can be seen from the skeleton diagram of the lower-left corner of FIG. 2, in case of the structural shape and geometry of lower link 6 shown in FIG. 2, the center-of-gravity W of lower link 6 is situated greatly away from the center of crankpin 5. As can be seen from the skeleton diagram of the lower-left corner of FIG. 3, FIG. 3 shows characteristic curves of 1st-order, 2nd-order, 3rd-order, 4th-order, and over-all vibration frequency components obtained when the center-of-gravity W of lower link 6 is situated near the center of crankpin 5. On the other hand, FIG. 4 shows characteristic curves of 1st-order, 2nd-order, 3rd-order, 4th-order, and over-all vibration frequency components obtained when the center-of-gravity W of lower link 6 is situated to be identical to the center of crankpin 5. As appreciated from comparison among the characteristic curves shown in FIGS. 2, 3 and 4, there is an increased tendency for the second-order and more higher-order vibration frequency components to be effectively attenuated, as the center-of-gravity W is shifted towards the center of crankpin 5. That is, it is possible to effectively attenuate the second-order and more higher-order vibration frequency components occurring due to the lower link, by setting the center-of-gravity W of lower link 6 as close to the center of crankpin 5 as possible.

Figure 6:
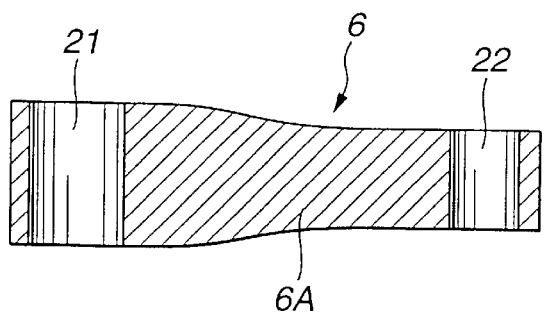
FIG. 6 is a cross section taken along the line VI—VI of FIG. 5.
Figure 7:
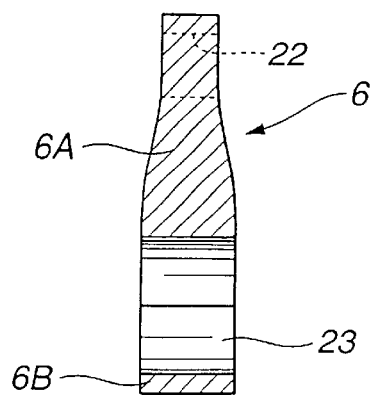
FIG. 7 is a cross section taken along the line VII—VII of FIG. 5.

FIGS. 5, 6 and 7 show the detailed structural shape of lower link 6. As can be seen from the elevation view of FIG. 5, lower link 6 is formed with a first pin hole 21 into which first connecting pin 7 is fitted, a second pin hole 22 into which second connecting pin 8 is fitted, and a third pin hole (a crankpin hole) 23 into which crankpin 5 is fitted. Generally, in order to attach lower link 6 to crankpin 5 on the crankshaft, the lower link must be divided into two parts along a plane passing through the crankpin axis. In the structural shape of lower link 6 shown in FIGS. 1, 5, 6 and 7, lower link 6 is divided into main lower link portion 6A and cap portion 6B along the plane passing through the center of third pin hole 23 (i.e., the crankpin axis). Main lower link portion 6A is formed with both of first and second pin holes 21 and 22. As can be appreciated from the assembled view of FIG. 1, the combustion load is transmitted through upper link 3 and first connecting pin 7 to lower link 6, and then transmitted to crankpin 5. With the lower link divided into main lower link portion 6A (having all of first and second connecting pin holes 21 and 22) and cap portion 6B as discussed above, the combustion load can be transmitted mainly through the main lower link portion to the crankpin. Thus, there is a less shearing force and load applied to the division wall surface through which the lower link is divided into two parts 6A and 6B. As can be seen from the two different sizes of first and second pin holes 21 and 22 shown in FIG. 5, the outside diameter of first connecting pin 7 that directly receives the combustion load is dimensioned to be greater than that of second connecting pin 8 serving as the fulcrum point of oscillating motion or swinging motion of lower link 6, since the magnitude of the load acting on second connecting pin 8 is comparatively less than that of first connecting pin 7 directly receiving the combustion load. In other words, second connecting pin 8 can be down-sized in diameter as much as possible. Downsizing the second connecting pin prevents or suppresses the center-of-gravity W (derived from the equivalent inertia weight ($W_0$+$W_1$+$W_2$+$W_3$+$W_4$) of lower link 6) from being situated away from the center of crankpin 5. As clearly shown in FIG. 6, regarding the thickness of the lower-link upper portion extending from first pin hole 21 to second pin hole 22, a portion around second connecting pin hole 22 is comparatively thin-walled, while a portion around first connecting pin hole 21 is comparatively thick-walled. At the intermediate portion between the peripheral portion around second pin hole 22 and the peripheral portion around first pin hole 21, the thickness of main lower link portion 6A changes gradually so that the peripheral portion around second pin hole 22 is continuously and smoothly connected with the peripheral portion around first pin hole 21. Such a proper change in thickness provides a sufficient mechanical strength between first connecting pin 7 and crankpin 5, and ensures a properly increased bearing surface area for first connecting pin 7. FIG. 7 shows the cutaway of lower link 6, having the crankpin hole 23 at its lower part and the two pin holes 21 and 22 at its upper part, along the vertical line VII—VII of FIG. 5. As clearly shown in FIG. 7, a portion around crankpin 5 (that is, a portion around crankpin hole 23) is comparatively thick-walled, while a portion around first connecting pin 7 is comparatively thin-walled. The thickness of lower link 6 is thin-walled gradually from the peripheral portion around crankpin 5 towards the upper part of lower link 6. This provides the same effect as the previously-discussed thickness change from the peripheral portion around first pin hole 21 to the peripheral portion around second pin hole 22. That is to say, owing to the thickness change from the peripheral portion around crankpin hole 23 to the upper portion (viewing FIGS. 5 and 7) of lower link 6, it is possible to prevent or suppress the center-of-gravity W from being situated away from the center of crankpin 5, while effectively reducing the total weight of the lower link.

Figure 8:
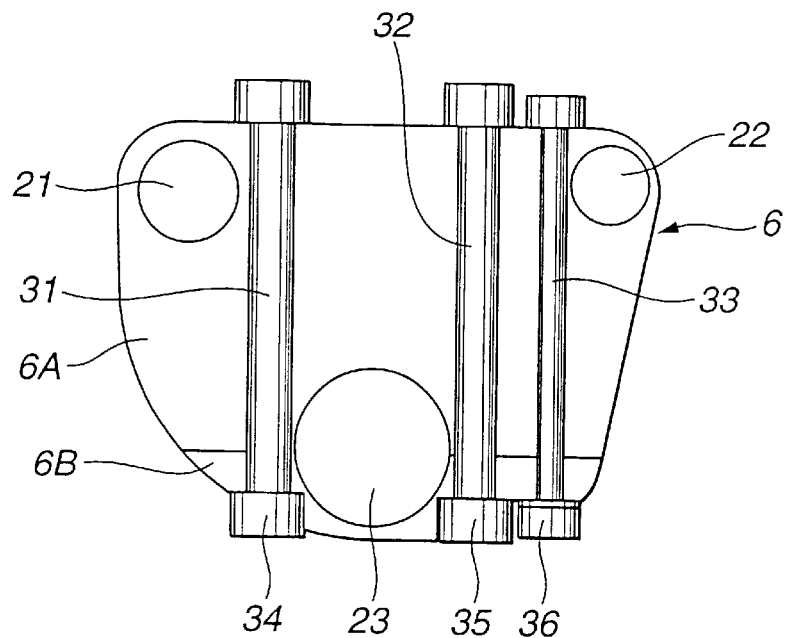
FIG. 8 is a cross section of the lower link, showing one bolt arrangement for the lower link.

Referring now to FIG. 8, there is shown the concrete installation structure of bolts (31, 32, 33) and nuts (34, 35, 36) used to integrally connect main lower link portion 6A and cap portion 6B. In the example shown in FIG. 8, three bolts 31, 32 and 33 are used. A first bolt 31 of the three bolts is located between crankpin 5 and first connecting pin 7. The remaining two bolts, namely a second bolt 32 and a third bolt 33 are both located between crankpin 5 and second connecting pin 8, since the distance between crankpin 5 (i.e., third pin hole 23) and second connecting pin 8 (i.e., second pin hole 22) is relatively longer than that between crankpin 5 and first connecting pin 7. First and second bolts 31 and 32, laid out substantially symmetrically with respect to the axis of crankpin 5, have the same bolt diameter. Third bolt 33 located nearer to second connecting pin 8 is down-sized in bolt diameter in comparison with second bolt 32 located nearer to crankpin 5. According to the aforementioned bolt layout, the center-of-gravity W can be situated near the center of crankpin 5, by relatively downsizing the diameter of third bolt 33 located away from crankpin 5 in comparison with the diameter of each of first and second bolts 34 and 35 located close to crankpin 5. In the bolt layout shown in FIG. 8, each of main lower link portion 6A and cap portion 6B is formed with three bolt holes (through openings) for the first, second, third bolts. When assembling, the first, second, and third bolts (31, 32, 33) are first inserted into upper opening ends of the respective bolt holes formed in main lower link portion 6A. Then, the threaded ends of first, second, and third bolts (31, 32, 33) are further inserted into the respective bolt holes formed in cap portion 6B. Thereafter, main lower link portion 6A and cap portion 6B are firmly connected or matched to each other by tightening each of nuts (34, 35, 36) mounted on the cap portion 6B and engaged with the respective threaded ends of bolts (31, 32, 33) to a specified tightening torque.

Figure 9:
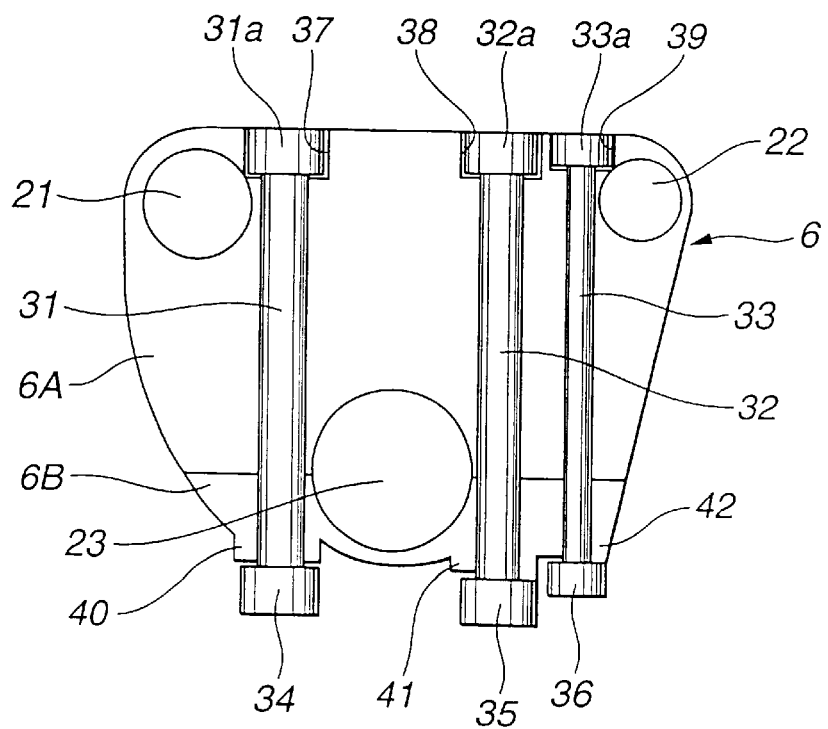
FIG. 9 is a cross section of the lower link, showing another bolt arrangement for the lower link.
Figure 10:
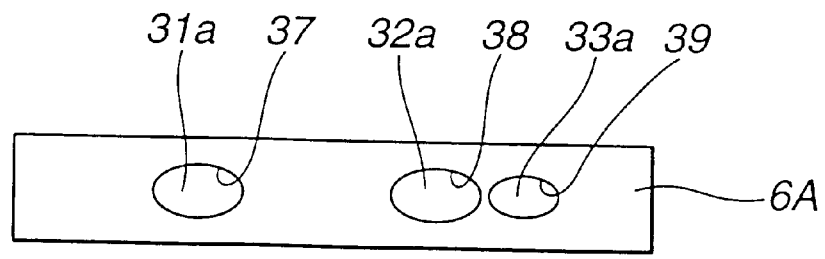
FIG. 10 is a top view of the lower link shown in FIG. 9.

Referring now to FIGS. 9 and 10, there is shown another installation structure of bolts (31, 32, 33) and nuts (34, 35, 36) used to integrally connect main lower link portion 6A and cap portion 6B. In the bolt layout shown in FIGS. 9 and 10, each of headed portions (31a, 32a, 33a) of three bolts (31, 32, 33) is formed into a deformed shape or an elongated shape (such as an oval cross section, an elliptical cross section, or a rectangular cross section) that prevents the headed portion from rotating about its axis. As clearly shown in FIG. 10, each of headed portions (31a, 32a, 33a) is elongated in a direction perpendicular to the axial direction of crankshaft 4. On the other hand, main lower link portion 6A is formed in its upper end surface with recessed portions (37, 38, 39) respectively configured to be substantially conformable to the elongated shapes of headed portions (31a, 32a, 33a), such that the headed portions are fitted into the respective recessed portions. As clearly shown in FIG. 10, the dimension of each of recessed portions (37, 38, 39), measured in the axial direction of crankshaft 4, is relatively less than the dimension of each of recessed portions (37, 38, 39), measured in the direction normal to the axial direction of crankshaft 4. Thus, it is possible to provide the recessed portions without increasing the thickness of lower link 6. As can be seen from the cross sectional view of FIG. 9, headed portions (31a, 32a, 33a) are fully accommodated in the respective recessed portions (37, 38, 39) without projecting from the top face of lower link 6. Three nuts (34, 35, 36) are installed on the cap portion 6B, but these nuts are seated on respective seat portions (40, 41, 42) integrally formed with the cap portion 6B. Actually, each of the seat portions is boss-shaped in such a manner as to slightly project from the bottom face of the cap portion. In the bolt layout of FIG. 9, each of the seat portions (40, 41, 42) serves as a nut seat. In the bolt layout shown in FIGS. 9 and 10, by way of fitted-engagement of the headed portions of bolts (31, 32, 33) with the respective recessed portions (37, 38, 39) each having an elongated cross section, the bolts are prevented from rotating about their axes. Therefore, it is possible to easily tightening nuts (34, 35, 36) from the lower side of the cylinder block, thereby ensuring time saved in installation. Additionally, each of headed portions (31a, 32a, 33a) can be installed as if the headed portions are buried in main lower link portion 6A, and simultaneously seat portions (40, 41, 42) are boss-shaped and projected downwards from the bottom face of cap portion 6B. Thus, the center-of-gravity W can be situated closer to the center of crankpin 5. Seat portions (40, 41, 42) formed on the bottom of cap portion 6B are useful to increase the distance (i.e., the wall thickness)

between the inner peripheral wall surface (bearing surface) of third pin hole (crankpin hole) 23 and the bearing surface of each of the nuts. In other words, by the provision of the seat portions (40, 41, 42), it is possible to enhance the mechanical strength, rigidity and durability of the lower link assembly.

Figure 11:
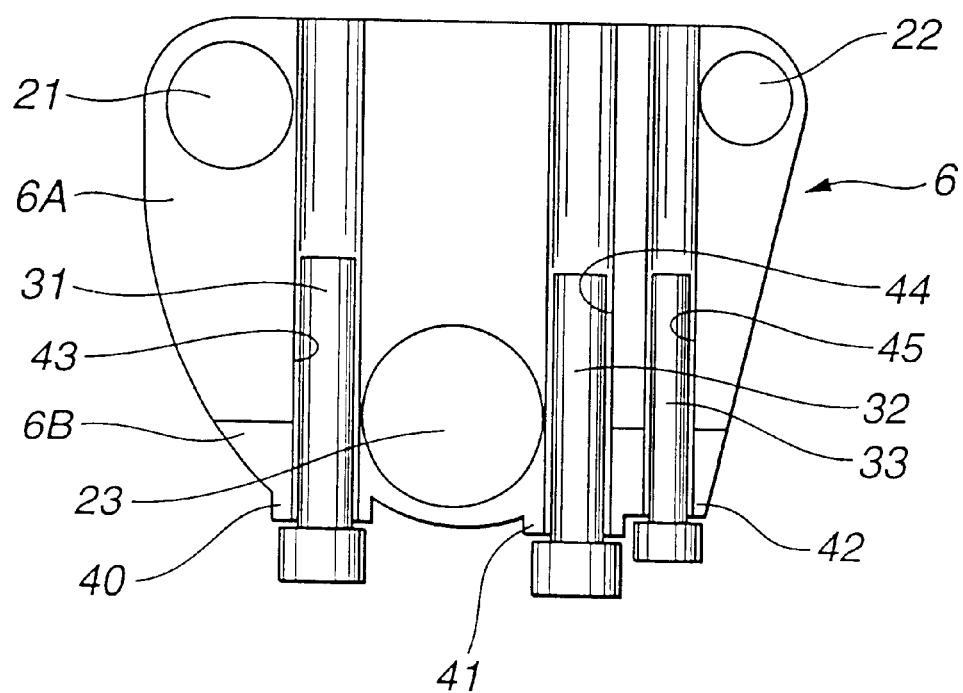
FIG. 11 is a cross section of the lower link, showing another bolt arrangement for the lower link.

Referring now to FIG. 11, there is shown another installation structure of bolts (31, 32, 33) used to integrally connect main lower link portion 6A and cap portion 6B. In the bolt layout shown in FIG. 11, cap portion 6B is provided with three bolt holes (through openings), while main lower link portion 6A is provided with three female screw-threaded portions (43, 44, 45). As shown in FIG. 11, when assembling, three bolts (31, 32, 33) are first inserted into lower opening ends of the respective bolt holes formed in cap portion 6B. Then, the bolts are screwed into the respective female screw-threaded portions formed in main lower link portion 6A. In a similar manner as the bolt layout of FIG. 9, in the bolt layout shown in FIG. 11 the cap portion 6B is formed with three boss-shaped seat portions (40, 41, 42) projected downwards from the bottom face of cap portion 6B. In this case, each of the seat portions (40, 41, 42) serves as a bolt seat. According to the bolt layout of FIG. 11, it is possible to easily tighten bolts (31, 32, 33) from the lower side of the cylinder block. Furthermore, as can be appreciated from the cross-sectional view of FIG. 11, bolts (31, 32, 33) are located near the crankpin, and therefore the center-of-gravity W of lower link 6 can be effectively situated nearer the center of crankpin 5. As shown in FIG. 11, by further boring upward-extending through openings or further forming upward-extending threaded portions in the main lower link portion 6A continuously from the respective female threaded portions (43, 44, 45), it is possible to more effectively lighten the main lower link portion.

Figure 12:
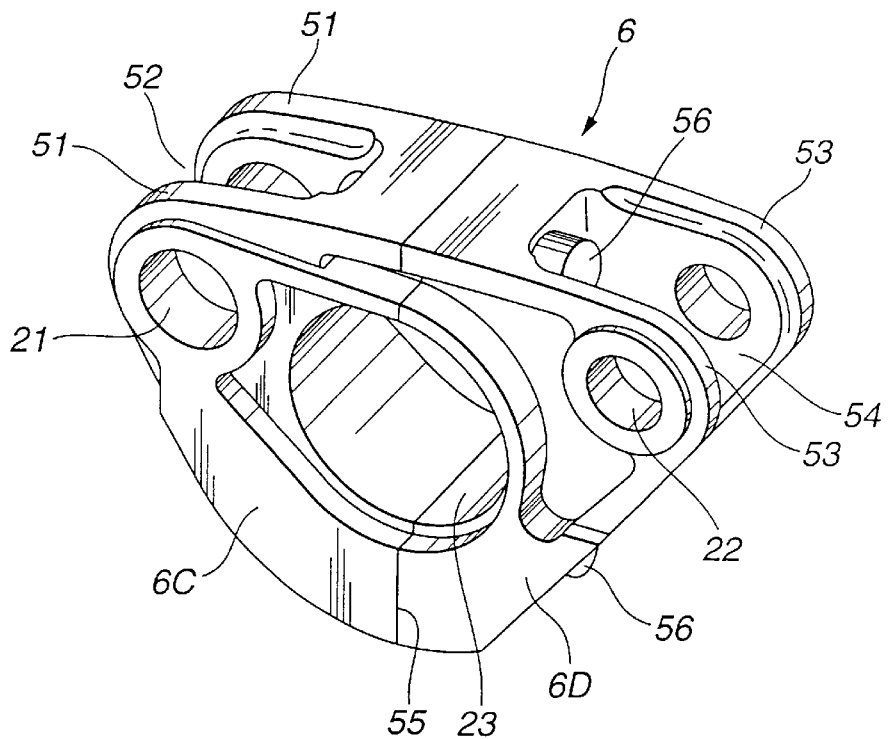
FIG. 12 is a perspective view illustrating the other structural shape of the lower link.
Figure 13:
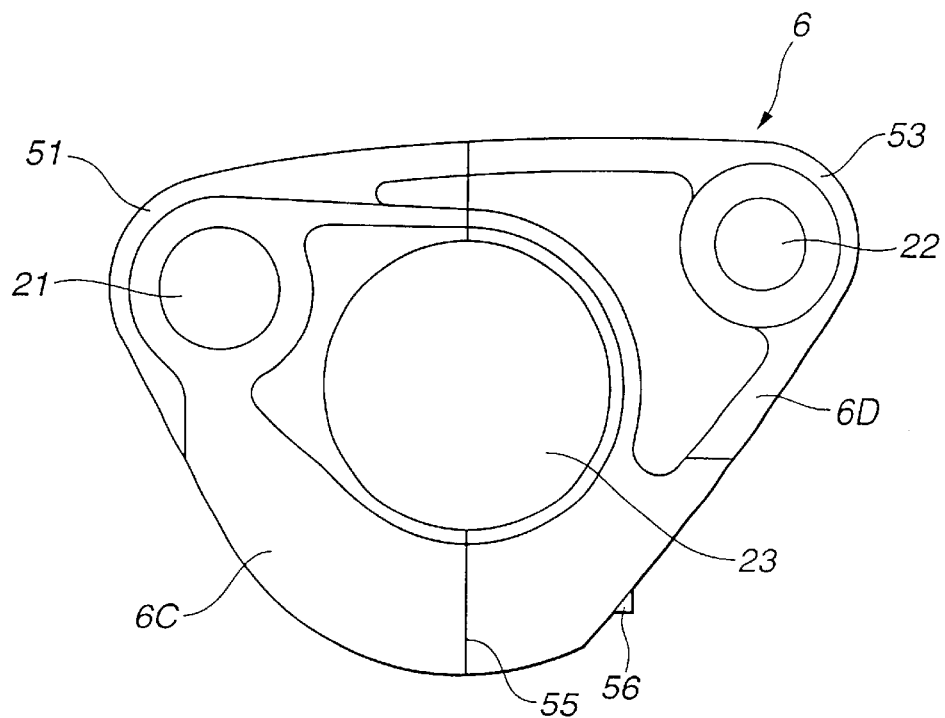
FIG. 13 is an elevation view of the lower link of FIG. 12.
Figure 14:
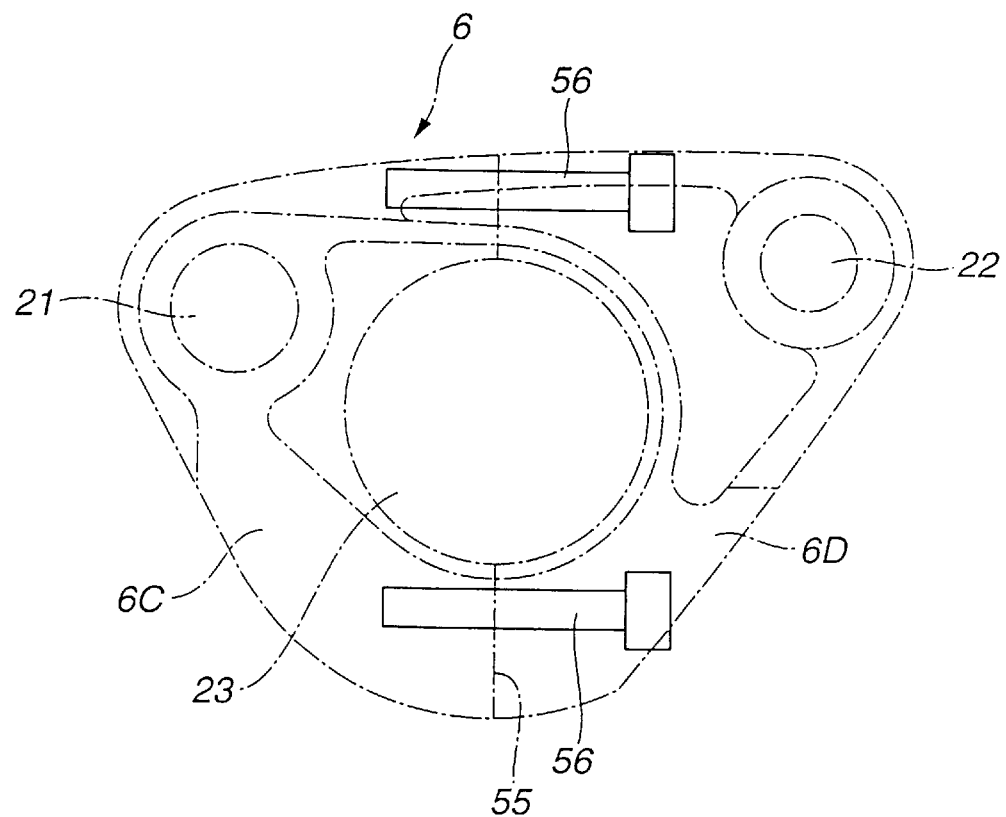
FIG. 14 is an explanatory view showing the layout of bolts used to integrally connect two split parts of the lower link of FIG. 12.
Figure 15:
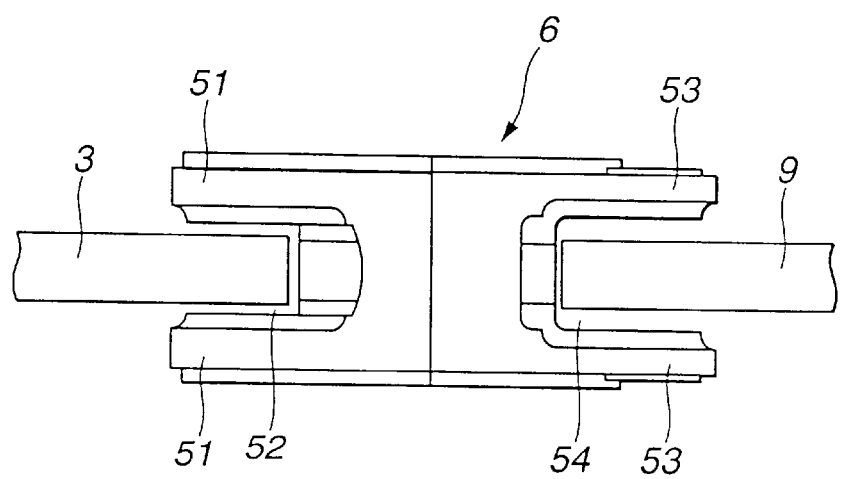
FIG. 15 is a top view showing the position relationship among the lower link, the upper link, and the control link.

Referring now to FIGS. 12 through 14, there is shown the other embodiment of lower link 6. In the same manner as the lower link shown in FIGS. 5–7, the lower link shown in FIGS. 12–14 is provided with first, second and third pin holes 21, 22 and 23. The first and second pin holes support the respective connecting pins 7 and 8. Crankpin 5 is linked into third pin hole 23. To provide great strength and rigidity enough to withstand the great combustion load, it is more preferable to construct a first one of two connected links as a forked shape so that one end of the second link is sandwiched between a pair of arm portions of the forked end of the first link. Suppose that one end of upper link 3 and/or one end of control link 9 is constructed as a forked end. In such a case, an intermediate rod portion being continuous with the forked end of at least one of upper link 3 and control link 9 tends to be thick-walled. This results in an increased weight of upper link 3 and/or control link 9. Such an increased weight of upper link 3 and/or control link 9 may result in undesirably amplified vibration frequency components. From the view point of reduced noise and vibration and reduced total weight of the multiple-link type piston crank mechanism, it is desirable to construct each pinned or linked end of lower link 6 as a forked end. In this case, lower link 6 has two forked ends and thus the weight of the lower link itself tends to increase, while each of upper link 3 and control link 9 has no forked end and thus the weight of each of the upper link and the control link tends to decrease. As a result, the total weight of the multiple-link type piston crank mechanism can be reduced. The somewhat increased weight of lower link 6 generally acts to deteriorate the noise/vibration attenuation performance. However, it is possible to minimize the deterioration of the noise/vibration attenuation performance by properly setting the position of center-of-gravity W of lower link 6, that is, by setting the center-of-gravity W of lower link 6 as close to the center of crankpin 5 as possible. In the embodiment of FIG. 12, the lower-link upper left end in which first pin hole 21 is formed, is actually constructed as a forked end. The forked end is composed of a pair of first arm portions or a pair of first boss-shaped portions (51, 51), each formed with through openings serving as the first pin hole, and a first recessed portion 52 defined between the first arm portions. In a similar manner, the lower-link upper right end in which second pin hole 22 is formed, is actually constructed as a forked end. The forked end is composed of a pair of second arm portions or a pair of second boss-shaped portions (53, 53), each formed with through openings serving as the second pin hole, and a second recessed portion 54 defined between the second arm portions. In the lower link structure shown in FIG. 12, both ends of first connecting pin 7 are supported by the first arm portions (51, 51), whereas both ends of second connecting pin 8 are supported by the second arm portions (53, 53). As best seen in FIG. 15, upper link 3 (i.e., the upper-link lower end), fitted into first recessed portion 52 defined between first arm portions (51, 51), is oscillatingly supported by the intermediate portion of first connecting pin 7. Control link 9 (i.e., the control-link upper end), fitted into second recessed portion 54 defined between second arm portions (53, 53), is oscillatingly supported by the intermediate portion of second connecting pin 8. First connecting pin 7 is press-fitted to the lower boss-shaped end of upper link 3. On the other hand, second connecting pin 8 is rotatably supported by both second pin hole 22 of lower link 6 and a pin hole formed in the upper boss-shaped end of control link 9 via a bushing (not shown), in a full-float fashion. In other words, in order to attach lower link 6 and control link 9 with second connecting pin 8, the bushing is used. The second connecting pin is not locked to either the lower link or the control link. This method is called "free floating". The second connecting pin 8 is free to rotate (float) on the inner peripheral wall defining the second pin hole and on the inner peripheral wall defining the pin hole formed in the control-link upper boss-shaped end. In the embodiment shown in FIGS. 12–14, lower link 6 is divided into two parts along the direction substantially normal to a straight line passing through both the center of first pin hole 21 and the center of second pin hole 22. As best shown in FIG. 13, the lower link is divided into a first lower link portion 6C (see the left-hand half of FIGS. 13 and 14) including first pin hole 21 and a second lower link portion 6D (see the right-hand half of FIGS. 13 and 14) including second pin hole 22 along a division wall surface 55 which consists of a plane passing through the center of third pin hole 23 (that is, the crankpin axis) and substantially normal to the straight line passing through both the center of first pin hole 21 and the center of second pin hole 22. As shown in FIG. 14, first and second lower link portions 6C and 6D are integrally connected to each other by tightening a pair of bolts (56, 56) located at both sides of third pin hole 23. As shown in FIG. 14, second (right-hand) lower link portion 6D is provided with two bolt holes (two through openings), while first (left-hand) lower link portion 6C is provided with two female screw-threaded portions. As can be seen from the explanatory view of FIG. 14, when assembling, the bolts (56, 56) are first inserted into opening ends of the respective bolt holes formed in second lower link portion 6D. Then, the bolts are screwed into the respective female screw-threaded portions formed in first lower link portion 6C. In the embodiment shown in FIGS. 12–14, in a similar manner as the embodiment shown in FIGS. 5–7, the shape and dimensions of lower link 6 are designed or determined, so that the center-of-gravity W is situated near the center of crankpin 5 or situated to be identical to the center of crankpin 5, by adding the weights $W_1$ and $W_2$ of first and second connecting pins 7 and 8, the weight $W_3$ of the lower boss-shaped end of upper link 3, and the weight $W_4$ of the upper boss-shaped end of control link 9 to the self-weight $W_0$ of the lower link itself.

Figure 16:
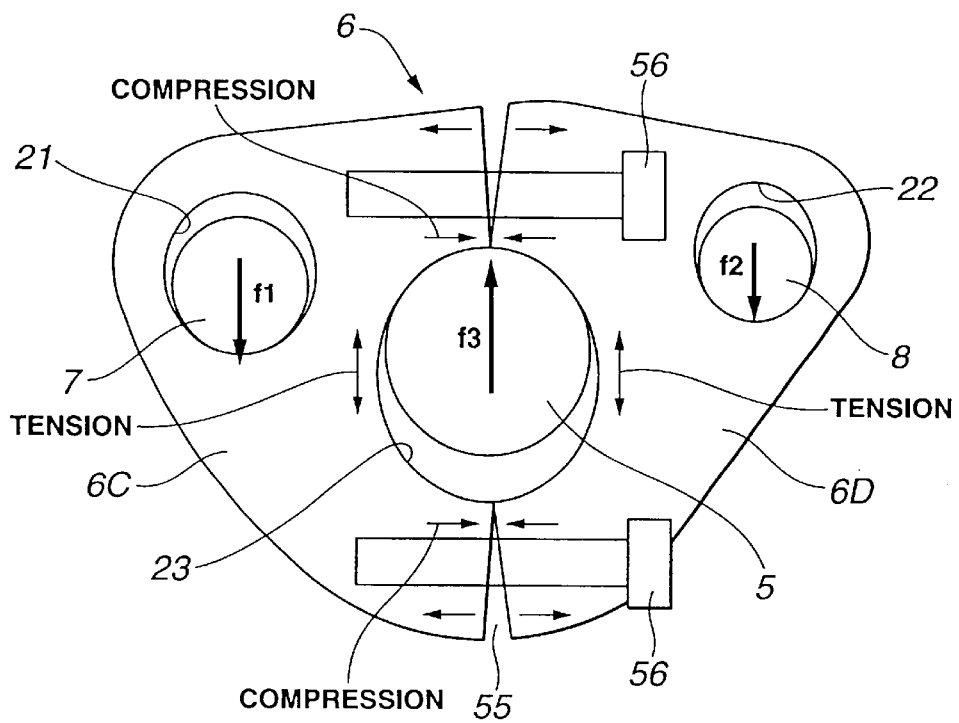
FIG. 16 is a diagram illustrating analytical mechanics for forces acting on the lower link and the division wall surface through which the lower link of FIG. 12 is divided into two parts.
Figure 17:
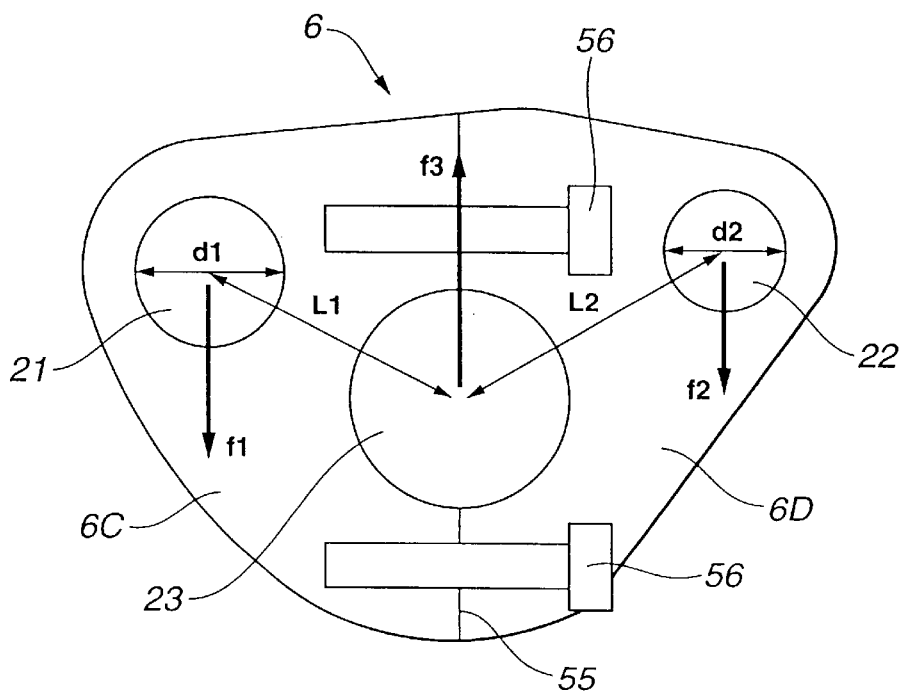
FIG. 17 is an explanatory view showing various dimensions, namely an inside diameter d1 of a first connecting pin hole, an inside diameter d2 of a second connecting pin hole, a distance L1 between the first connecting pin hole and the crankpin hole, and a distance L2 between the second connecting pin hole and the crankpin hole, and the magnitudes of applied forces f1, f2, and f3.
Figure 18:
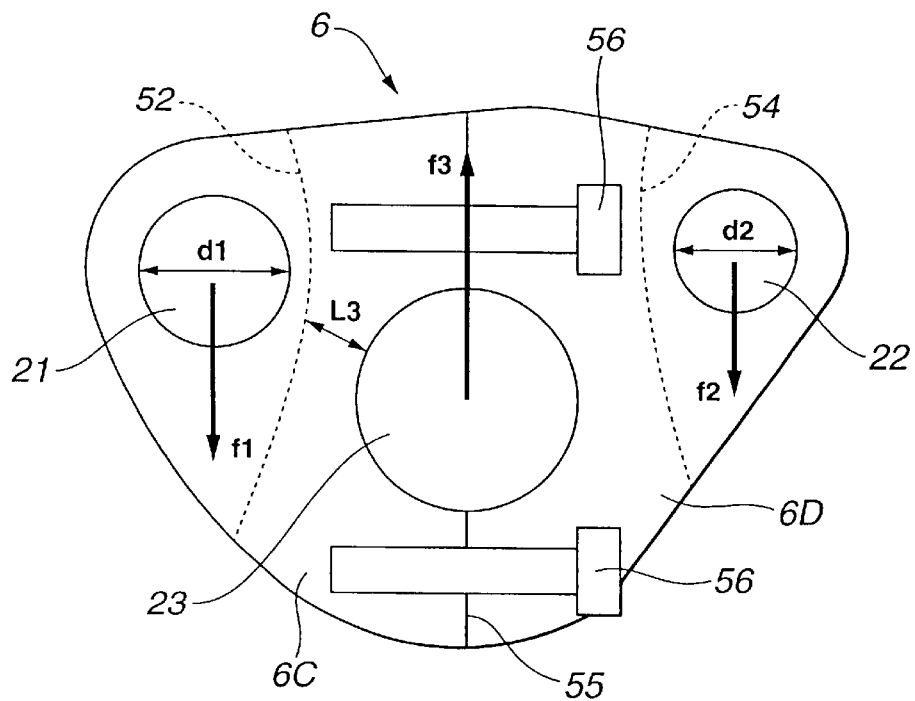
FIG. 18 is an explanatory view showing the shortest distance L3 between the first connecting pin hole (for the connecting pin of the upper link) and the crankpin hole.

FIG. 16 shows the directions of forces (tensile and compressive loads) applied to lower link 6 having a two-split structure shown in FIGS. 12–14. During operation of the reciprocating engine, when the combustion load is applied through the crown of piston 1 to the multiple-link type piston crank mechanism, first and second connecting pins 7 and 8 are pushed down. As a result, a downward force f1 acts on the bearing surface of the first pin hole for first connecting pin 7, and at the same time a downward force f2 acts on the bearing surface of the second pin hole for second connecting pin 8. In contrast to the above, a reaction force (upward force) f3 acts on the bearing surface of the third pin hole for crankpin 5. Tensile forces act upon the peripheral portion around third pin hole 23, exactly the half-round portions of first and second lower link portions 6C and 6D. As clearly shown in FIG. 16, the direction of action of each of the tensile forces is a direction parallel to the division wall surface 55. On the other hand, compressive forces act upon the inside mated portions of two-split lower link portions 6C and 6D, located inside of the intermediate portions of two bolts (56, 56) and close to the outer periphery of crankpin 5. The compressive forces serve to hold the mated state of first and second lower link portions 6C and 6D. In other words, there is less tensile load acting to open the division wall surface 55 at the previously-noted inside mated portions. Therefore, it is possible to set an axial force required for each of bolts (56, 56) to a comparatively small value. This enables the use of bolt 56 having a comparatively small bolt diameter, thus reducing the entire weight of the lower link assembly. In the lower link structure shown in FIG. 16, the headed portion of each of bolts (56, 56) is located at second lower link portion 6D and the thread of each of bolts (56, 56) is screwed into the corresponding female screw-threaded portion formed in first lower link portion 6C. This eliminates the need to provide a seat portion (on which the headed portion of each bolt or each nut is seated) at first lower link portion 6C. In the absence of seat portions formed in first lower link portion 6C, the peripheral portion around first connecting pin 6C is strong enough to maintain rigidity and mechanical strength. Also, the construction of first lower link portion 6C equipped with first connecting pin 7 receiving great combustion and inertia loads is simplified. Thus, it is possible to avoid a concentration of stress between first connecting pin 7 and crankpin 5, and additionally it is possible to reduce the total weight of lower link 6. In the lower link structure of FIGS. 12–14, as shown in FIG. 17, the distance L1 between the center of third pin hole 23 and the center of first pin hole 21 is less than the distance L2 between the center of third pin hole 23 and the center of second pin hole 22 (that is, L1<L2), and the diameter d1 of first pin hole 21 is greater than the diameter d2 of second pin hole 22 (that is, d1>d2). Additionally, the magnitude of downward force f1 acting on the bearing surface of first pin hole 21 is greater than the magnitude of downward force f2 acting on the bearing surface of second pin hole 22 (that is, f1>f2). For the reasons discussed above, it is undesirable to provide seat portions at first lower link portion 6C. Moreover, by way of press fitting, first connecting pin 7 is securely connected to the boss-shaped portion of upper link 3, and therefore it is possible to reduce the outside dimensions of the boss-shaped portion of upper link 3, while ensuring a required mechanical strength of the connecting portion between upper and lower links 3 and 6. As a result, it is possible to reduce the size of first recessed portion 52 configured to be substantially conformable to the boss-shaped portion of upper link 3. By small-sizing the first recessed portion it is possible to set the shortest distance L3 between the bottom face (see the left-hand side broken line of FIG. 18) of first recessed portion 52 and the circumference of third pin hole 23 (i.e., the crankpin hole) to a comparatively great value. In contrast to the above, second connecting pin 8 is rotatably supported in a full-float fashion, as set forth above. In case of the free-floating second connecting pin, it is possible to set an allowable bearing stress at a higher level than the press-fitted first connecting pin. Therefore, it is possible to down-size the diameter of second connecting pin 8. As a result, it is possible to effectively reduce the entire weight of the lower link assembly including the second connecting pin.

Figure 19:
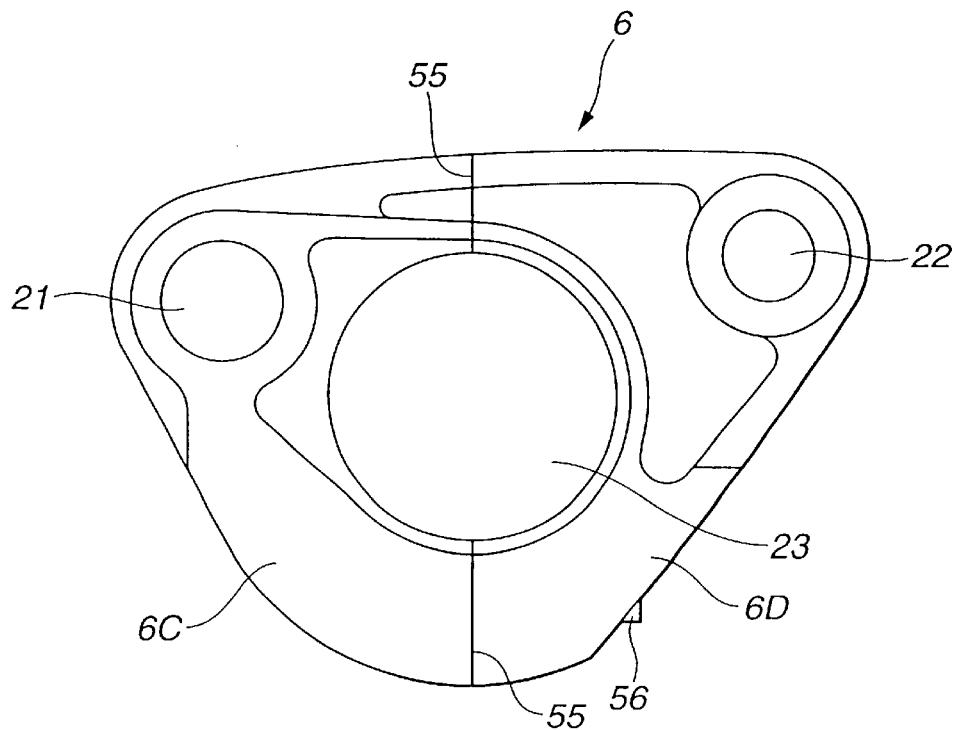
FIG. 19 is an elevation view of the lower link having the division wall surface formed by way of cracking.

FIG. 19 shows one manufacturing process of division wall surface 55 between first and second lower link portions 6C and 6D. First, by way of casting (or die-casting) lower link 6 is temporarily formed as a cast lower-link product (a semi-finished product). In this state, the cast lower-link product has first and second lower link portions 6C and 6D integrally formed with each other. After casting, the cast lower-link product is broken into or cracked into or divided into two parts, namely first and second lower link portions 6C and 6D by way of cracking. By providing the division wall surface 55 as a cracked section by way of cracking, it is possible to suppress undesired slippage occurring in a direction parallel to the division wall surface. This effectively reduces a shearing force acting on each of bolts (56, 56), and also enhances the accuracy of positioning of first lower link portion 6C relative to second lower link portion 6D. Reducing the shearing force acting on each bolt (56, 56) contributes to down-sizing of the bolt. In the shown embodiment, the lower link has a comparatively great division wall surface, and thus the previously-noted cracking is a very effective manufacturing method for a lower link of a two-split structure. Furthermore, according to the manufacturing process of the two-split lower link as explained in reference to FIG. 19, it is possible to enhance the circularity of third pin hole 23.

The entire contents of Japanese Patent Application Nos. P2000-316020 (filed Oct. 17, 2000) and P2000-245448 (filed Aug. 14, 2000) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A piston crank mechanism of a reciprocating internal combustion engine including a piston moveable through a stroke in the engine and having a piston pin and a crankshaft changing reciprocating motion of the piston into rotating motion and having a crankpin, the piston crank mechanism comprising:

an upper link connected at one end to the piston via the piston pin;

a lower link connected to the other end of the upper link via a first connecting pin and connected to the crankpin;

a control link connected at one end to the lower link via a second connecting pin and pivoted at its other end to a body of the engine to permit oscillating motion of the control link on the body of the engine;

a center-of-gravity of the lower link lying inside of a triangle defined by three vertexes corresponding to a center of the first connecting pin, a center of the second connecting pin, and a center of the crankpin; and a distance from the center-of-gravity to the center of the crankpin is less than at least one of a distance from the center-of-gravity to the center of the first connecting pin and a distance from the center-of-gravity to the center of the second connecting pin.

2. The piston crank mechanism as claimed in claim 1, wherein the distance from the center-of-gravity to the center of the crankpin is less than the distance from the center-of-gravity to the center of the first connecting pin, and the distance from the center-of-gravity to the center of the crankpin is less than the distance from the center-of-gravity to the center of the second connecting pin.

3. The piston crank mechanism as claimed in claim 2, wherein the distance from the center-of-gravity to the center of the crankpin is 0.

4. The piston crank mechanism as claimed in claim 1, wherein the center-of-gravity is determined by a weight obtained by adding at least a weight of the first connecting pin and a weight of the second connecting pin to a self-weight of the lower link itself.

5. The piston crank mechanism as claimed in claim 4, wherein the center-of-gravity is determined by an equivalent inertia weight obtained by further adding a weight of a boss-shaped end of the upper link connected to the first connecting pin and a weight of a boss-shaped end of the control link connected to the second connecting pin to the self-weight of the lower link in addition to the weight of the first connecting pin and the weight of the second connecting pin.

6. A piston crank mechanism of a reciprocating internal combustion engine including a piston moveable through a stroke in the engine and having a piston pin and a crankshaft changing reciprocating motion of the piston into rotating motion and having a crankpin, the piston crank mechanism comprising:

an upper link connected at one end to the piston via the piston pin;

a lower link connected to the other end of the upper link via a first connecting pin and connected to the crankpin;

a control link connected at one end to the lower link via a second connecting pin and pivoted at its other end to a body of the engine to permit oscillating motion of the control link on the body of the engine;

a triangle being defined by three line segments, namely a first line segment between and including a center of the crankpin and a center of the first connecting pin, a second line segment between and including the center of the crankpin and a center of the second connecting pin, and a third line segment between and including the center of the first connecting pin and the center of the second connecting pin;

a first center-of-gravity of the lower link, which is determined by a self-weight of the lower link itself except at least a weight of the first connecting pin and a weight of the second connecting pin, is laid out to be opposite to each of the first and second connecting pins with respect to the center of the crankpin; and a second center-of-gravity of the lower link, which is determined by an equivalent inertia weight obtained by adding the weight of the first connecting pin, the weight of the second connecting pin, a weight of a boss-shaped end of the upper link connected to the first connecting pin, and a weight of a boss-shaped end of the control link connected to the second connecting pin to the self-weight of the lower link, is laid out closer to the center of the crankpin than the first center-of-gravity.

7. The piston crank mechanism as claimed in claim 1, wherein an angular velocity of the first connecting pin is set to be higher than an angular velocity of the second connecting pin at a midpoint of piston stroke at which a velocity of the piston reaches its peak.

8. The piston crank mechanism as claimed in claim 1, wherein an outside diameter of the first connecting pin is dimensioned to be greater than an outside diameter of the second connecting pin.

9. The piston crank mechanism as claimed in claim 1, wherein a thickness of a portion around the first connecting pin of the lower link is dimensioned to be greater than a thickness of a portion around the second connecting pin.

10. The piston crank mechanism as claimed in claim 1, wherein a thickness of a portion around the crankpin of the lower link is dimensioned to be greater than a thickness of a portion around the first connecting pin.

11. The piston crank mechanism as claimed in claim 1, wherein:

the lower link is divided into a main lower link portion including the first and second connecting pins and a cap portion along a plane that passes through the center of the crankpin;

the main lower link portion and the cap portion are integrally connected to each other by a plurality of bolts located on both sides of the crankpin; and an axis of a first bolt of the plurality of bolts passes between the crankpin and the first connecting pin, and an axis of a second bolt of the plurality of bolts passes between the crankpin and the second connecting pin.

12. The piston crank mechanism as claimed in claim 11, wherein:

an axis of a third bolt of the plurality of bolts passes between the crankpin and the second connecting pin; and the third bolt located nearer to the second connecting pin is downsized in bolt diameter in comparison with the second bolt located nearer to the crankpin.

13. The piston crank mechanism as claimed in claim 11, wherein:

each of the main lower link portion and the cap portion is formed with a plurality of bolt holes for the plurality of bolts; and threaded ends of the bolts inserted through the bolt holes of the main lower link portion into the bolt holes of the cap portion are threadably engaged with nuts mounted outside of the cap portion.

14. The piston crank mechanism as claimed in claim 11, wherein the main lower link portion is formed with a plurality of recessed portions accommodating therein respective headed portions of the bolts.

15. The piston crank mechanism as claimed in claim 14, wherein:

the recessed portions are respectively configured to be substantially conformable to shapes of the headed portions of the bolts; and each of the recessed portions is formed into an elongated shape that a dimension measured in an axial direction of the crankshaft is relatively smaller than a dimension measured in a direction normal to the axial direction of the crankshaft.

16. The piston crank mechanism as claimed in claim 11, wherein:

the cap portion is formed with a plurality of bolt holes for the plurality of bolts, and the main lower link portion is formed with a plurality of female screw-threaded portions for threaded-engagement with the bolts; and threaded portions of the bolts inserted through the bolt holes of the cap portion are screwed into the female screw-threaded portions.

17. The piston crank mechanism as claimed in claim 13, wherein the cap portion is formed with seat portions on which the bolts or the nuts are seated, so that each of the seat portions is boss-shaped and projected from a face of the cap portion.

18. The piston crank mechanism as claimed in claim 1, wherein:

a connected portion of the lower link to the upper link is formed as a first forked end comprising a first pair of boss-shaped portions, and a connected portion of the lower link to the control link is formed as a second forked end comprising a second pair of boss-shaped portions;

both ends of the first connecting pin are supported by the first pair of boss-shaped portions, and both ends of the second connecting pin are supported by the second pair of boss-shaped portions; and the upper link sandwiched between the first pair of boss-shaped portions is oscillatingly pinned to the lower link through the first connecting pin, and the control link sandwiched between the second pair of boss-shaped portions is oscillatingly pinned to the lower link through the second connecting pin.

19. The piston crank mechanism as claimed in claim 1, wherein the first connecting pin is press-fitted into a boss-shaped portion of the upper link, and the second connecting pin is rotatably connected to both the lower link and the control link by free floating.

20. The piston crank mechanism as claimed in claim 1, wherein the lower link is divided into a first lower link portion including the first connecting pin and a second lower link portion including the second connecting pin along a division wall surface consisting of a plane passing through the center of the crankpin.

21. The piston crank mechanism as claimed in claim 20, wherein:

the second lower link portion is formed with a plurality of bolt holes for a plurality of bolts, and the first lower link portion is formed with a plurality of female screw-threaded portions for threaded-engagement with the bolts; and threaded portions of the bolts inserted through the bolt holes of the second lower link portion are screwed into the female screw-threaded portions formed in the first lower link portion to integrally connect the first and second lower link portions to each other.

22. The piston crank mechanism as claimed in claim 11, wherein the division wall surface between the first and second lower link portions is formed as a cracked section by way of cracking.

* * * * *